Oct. 12, 1943.   A. F. UNDERWOOD   2,331,584
METHOD OF MAKING COMPOSITE ARTICLES
Filed April 15, 1941

INVENTOR
Arthur F. Underwood
BY
ATTORNEYS

Patented Oct. 12, 1943

2,331,584

UNITED STATES PATENT OFFICE 2,331,584

METHOD OF MAKING COMPOSITE ARTICLES

Arthur F. Underwood, Detroit, Mich., assignor to General Motors Corporation Detroit, Mich., a corporation of Delaware Application April 15, 1941, Serial No. 388,665

3 Claims. (Cl. 29—149.5)

This invention relates to composite articles and is particularly concerned with composite articles which include a layer of porous metal bonded to a relative non-porous supporting member.

The object of the invention is to provide a method for bonding a layer of porous metal to a relatively non-porous supporting member wherein the mold for shaping the porous metal layer includes as one portion thereof the relatively non-porous supporting member.

Another object of the invention is to provide a method for making a connecting rod wherein the connecting rod forms a portion of the die and wherein a graphite mold member or the like is positioned on the connecting rod and spaced thererfom to provide the desired thickness of the bearing layer, this space being filled with powdered metal which is sintered in the mold to form a porous metal layer which is bonded to the connecting rod whereupon the graphite portion may be removed.

A further object is to provide a connecting rod and bearing therefor wherein the connecting rod may be made of steel and may be subsequently quenched after the bearing layer is attached thereto whereupon the bearing layer may be impregnated at a suitable lower temperature with a soft bearing metal without impairing the hardness characteristics of the steel rod.

Further objects and advantages of the present invention will be apparent from the following description, reference being had to the accompanying drawing wherein a preferred embodment of the present invention is clearly shown.

Figure 1:
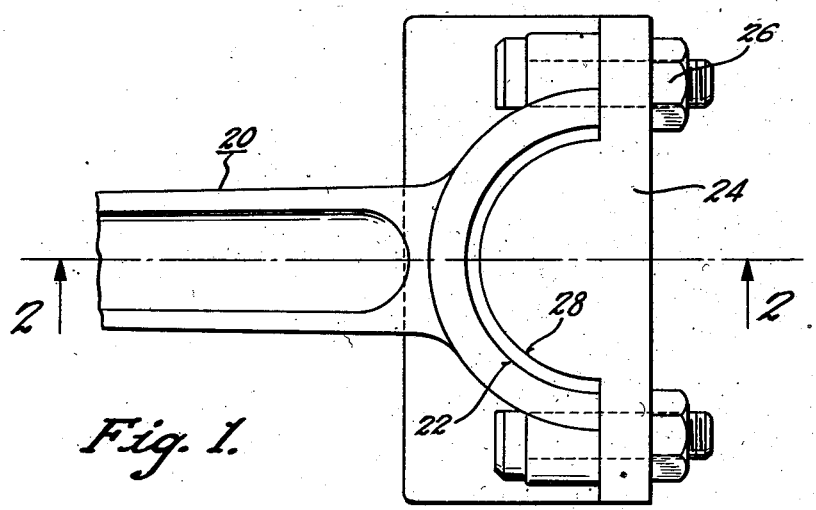
Fig. 1 is a plan view of a connecting rod with the mold member in place.
Figure 2:
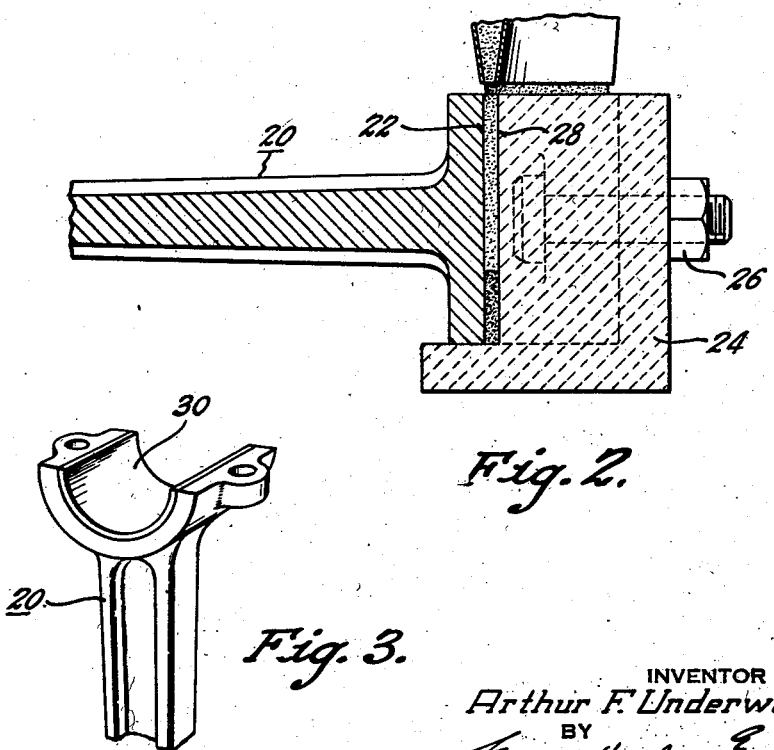
Fig. 2 is a cross sectional view taken on the line 2—2 of Fig. 1, showing the powder being filled into the mold cavity.
Figure 3:
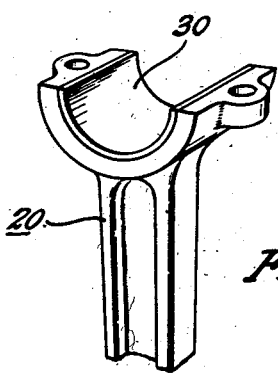
Fig. 3 is a fragmentary view of the finished connecting rod.

In the manufacture of porous metal articles from loose non-compacted metal powder it has been the conventional practice to form a mold of the desired configuration from graphite, oxidized chrome steel, or other suitable material which is non-adhering in nature to the powdered metal which is to be sintered therein. This mold is then filled with metal powder in a substantially loose non-compacted condition and is then placed in a suitable heating furnace at a desired temperature and heated under non-oxidizing conditions for sintering the powdered metal together into a porous metal article which may be removed from the mold after cooling. This invention is particularly directed to the manufacture of composite metal articles wherein a porous metal layer or portion is rigidly bonded to a more dense metal layer or portion and wherein the more dense metal forms a portion of the mold. For illustrative purposes a connecting rod 20 is shown in Fig. 1 wherein the rod 20 includes an arcuate surface 22 thereon which forms one mold surface. A graphite mold section 24 is preferably bolted thereto by means of bolts 26 which graphite section includes a complementary arcuate portion 28 that is held spaced from the surface 22. The cavity between the surfaces 22 and 28 is then filled with metal powder as shown in Fig. 2 which is loosely filled therein and which may be lightly tamped in place to reduce shrinkage. The entire assembly may then be placed in a sintering furnace and heated to a suitable temperature and for a suitable time under non-oxidizing conditions for causing the metal powder to sinter together into a porous metal layer 30 which is rigidly bonded to the arcuate surface 22 of the connecting rod 20. This practice reduces the cost of the molds and makes possible the bonding of the porous metal to irregular shaped supporting members. Obviously the connecting rod shown is illustrative of only one of such members and is to be understood that the present invention is of sufficient scope to include methods for making any type of composite metal member including a porous metal layer wherein the dense metal portion of the metal article comprises a portion of the mold.

Specifically, a copper nickel bearing layer may be bonded to a steel connecting rod by filling the mold cavity with a mixture of copper and nickel powder of suitable mesh size, for example from 150 to 250 mesh, wherein the proportions of copper are preferably in the ratio of 6 to 4. The metal powder may be lightly tamped into the mold if desired. Then the mold may be placed in the sintering furnace having a suitable non-oxidizing atmosphere and heated at a temperature of between 2000 to 2080° F. for from 15 to 30 minutes whereupon the copper and nickel powders alloy together to form a copper-nickel alloy that is highly porous and simultaneously this porous metal layer metallurgically bonds to the steel connecting rod. The entire assembly is then cooled under non-oxidizing conditions and the mold removed. In this instance the connecting rod includes a uniform layer of porous copper-nickel. The steel rod may be reheated under non-oxidizing conditions to a desirable temperature and quenched in water or oil and then drawn to the desired hardness. In this manner the connecting rod itself may be hardened without impairing the utility of the porous metal layer. Likewise the temperatures obtained during these hardening steps are the conventional temperatures used for hardening steel and are of course well below the sintering temperatures. After hardening the steel portion of the rod the copper nickel matrix may be impregnated with lead, babbitt, tin alloys, lead alloys, antimony alloys or any other suitable low melting point metal. The impregnation temperature is sufficiently low so as to prevent any noticeable change in the hardness of the steel. After the impregnation is completed the connecting rod will be the supporting member of the assembly and may be line bored to the desired diameter.

This method of manufacturing bearings eliminates the necessity of having removable bearing liners within the connecting rod which includes thereon the bearing layer.

If it is desired to have a bronze bearing layer copper and tin powders may be used with a sintering temperature preferably between 1500 and 1700° F., or the bearing layer may be made from iron and copper powder wherein a sintering temperature of 2000° is preferable. In any case where two metals are used the sintering temperature is preferably maintained intermediate the melting points of the two metals. Likewise, the metal powder may be prealloyed if desired, wherein the degree of alloyage is preferably not complete.

It is apparent that although the disclosure herein has been limited to connecting rods for illustrative purposes that any type of composite metal article may be made in a similar manner wherein one portion of the mold wall comprises the supporting member of the assembly and therefore it is to be understood that my invention is not limited in scope to a connecting rod, but is of sufficient scope to embrace any type of composite article which may be made by a similar method.

The present method also provides a means of applying powdered metal to vertical walls wherein one of the vertical walls of the mold is the supporting surface. Heretofore when using non-compacted metal powders the supporting surface has necessarily been in the flat or substantially flat condition whereby the metal powders are held thereon by gravity. It is apparent, that my invention permits the bonding of metal powders in the form of a porous metal layer to a vertical section or support by the simple expedient of using the support as a vertical portion of the mold.

While the embodiment of the present invention as herein disclosed, constitutes a preferred form, it is to be understood that other forms might be adopted, all coming within the scope of the claims which follow.

What is claimed is as follows:

1. In a method of forming composite metal articles including a portion of steel bonded to and supporting a layer of relatively porous metal, the steps comprising; providing a die which includes a steel portion as one part thereof together with a portion of non-adhering material spaced therefrom, pouring powdered metal into the space between the two portions of the die in a substantially loose non-compacted condition, heating the die with the powdered metal therein under suitable conditions for a time and a temperature sufficient for causing the powdered metal to sinter together into a porous metal layer which is bonded to the steel portion, then removing the non-adhering portion of the die quenching the article with the porous metal layer thereon and then drawing the article to obtain a desired hardness of the steel.

2. In a method of making bearings, the steps comprising providing a steel connecting rod having an arcuate surface thereon, associating a non-adhering member thereto having a complementary arcuate surface spaced from said first arcuate surface, said distance between said surfaces being the desired thickness of the bearing layer, filling said space with suitable powdered material in a substantially loose non-compacted condition, heating the connecting rod, powdered metal and member under suitable conditions for a time and at a temperature sufficient for causing the powdered metal to sinter together into a porous metal layer and simultaneously bond to the arcuate surface of the steel connecting rod, removing said member quenching the rod with the porous metal layer thereon and subsequently drawing the rod to obtain the desired hardness of the steel.

3. The method as claimed in claim 2 comprising the added step of subsequently impregnating the porous metal layer with a soft bearing metal.

ARTHUR F. UNDERWOOD.